(12) United States Patent
Ogino

(10) Patent No.: US 11,717,858 B2
(45) Date of Patent: Aug. 8, 2023

(54) ARTICLE SORTING SYSTEM

(71) Applicant: Daifuku Co., Ltd., Osaka (JP)

(72) Inventor: Kosuke Ogino, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 17/511,010

(22) Filed: Oct. 26, 2021

(65) Prior Publication Data

US 2022/0134385 A1 May 5, 2022

(30) Foreign Application Priority Data

Oct. 29, 2020 (JP) ................................ 2020-181544

(51) Int. Cl.
*B07C 3/00* (2006.01)
*B07C 3/02* (2006.01)

(52) U.S. Cl.
CPC ............... *B07C 3/008* (2013.01); *B07C 3/02* (2013.01)

(58) Field of Classification Search
CPC .. B07C 3/008; B07C 3/02; B07C 1/10; B07C 7/00
USPC ....................................................... 209/546
See application file for complete search history.

(56) References Cited

U.S. PATENT DOCUMENTS

| 6,878,896 | B2 * | 4/2005 | Braginsky | ............... B07C 7/005 |
| | | | | 700/214 |
| 8,457,781 | B2 * | 6/2013 | Bailey | ....................... B07C 3/02 |
| | | | | 700/224 |
| 10,052,661 | B2 | 8/2018 | Hayduchok et al. | |
| 2022/0241822 | A1 * | 8/2022 | Shan | ....................... B07C 3/003 |

FOREIGN PATENT DOCUMENTS

| JP | 5562646 B2 | 6/2014 |
| JP | 202075797 A | 5/2020 |
| JP | 202083510 A | 6/2020 |

* cited by examiner

*Primary Examiner* — Michael Mccullough
*Assistant Examiner* — Jessica L Burkman
(74) *Attorney, Agent, or Firm* — The Webb Law Firm

(57) ABSTRACT

An article sorting system includes: a sorting container support apparatus including a plurality of sorting container support units; a plurality of sorting containers supported by the sorting container support units; an automatic sorting apparatus that is arranged adjacent to the sorting container support apparatus and configured to automatically sort a plurality of articles into a plurality of articles; a work area that is set up adjacent to the sorting container support apparatus on a side opposite to the automatic sorting apparatus and in which an operator performs a sorting operation to sort articles into the plurality of sorting containers supported by the sorting container support units; and an operation display apparatus. The operation display apparatus displays, toward the work area, operation instruction-related information on each of the plurality of sorting container support units or each of the plurality of sorting containers.

13 Claims, 6 Drawing Sheets

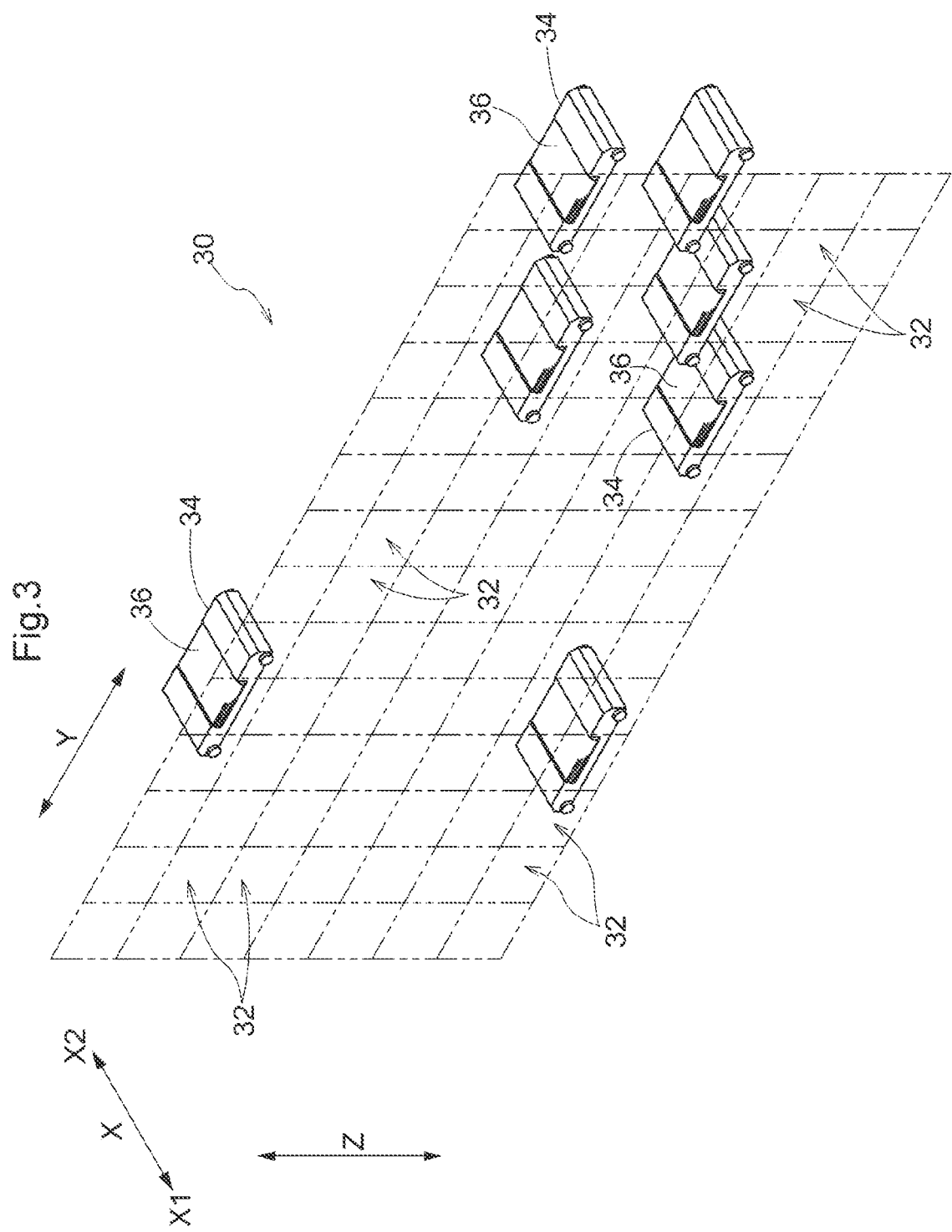

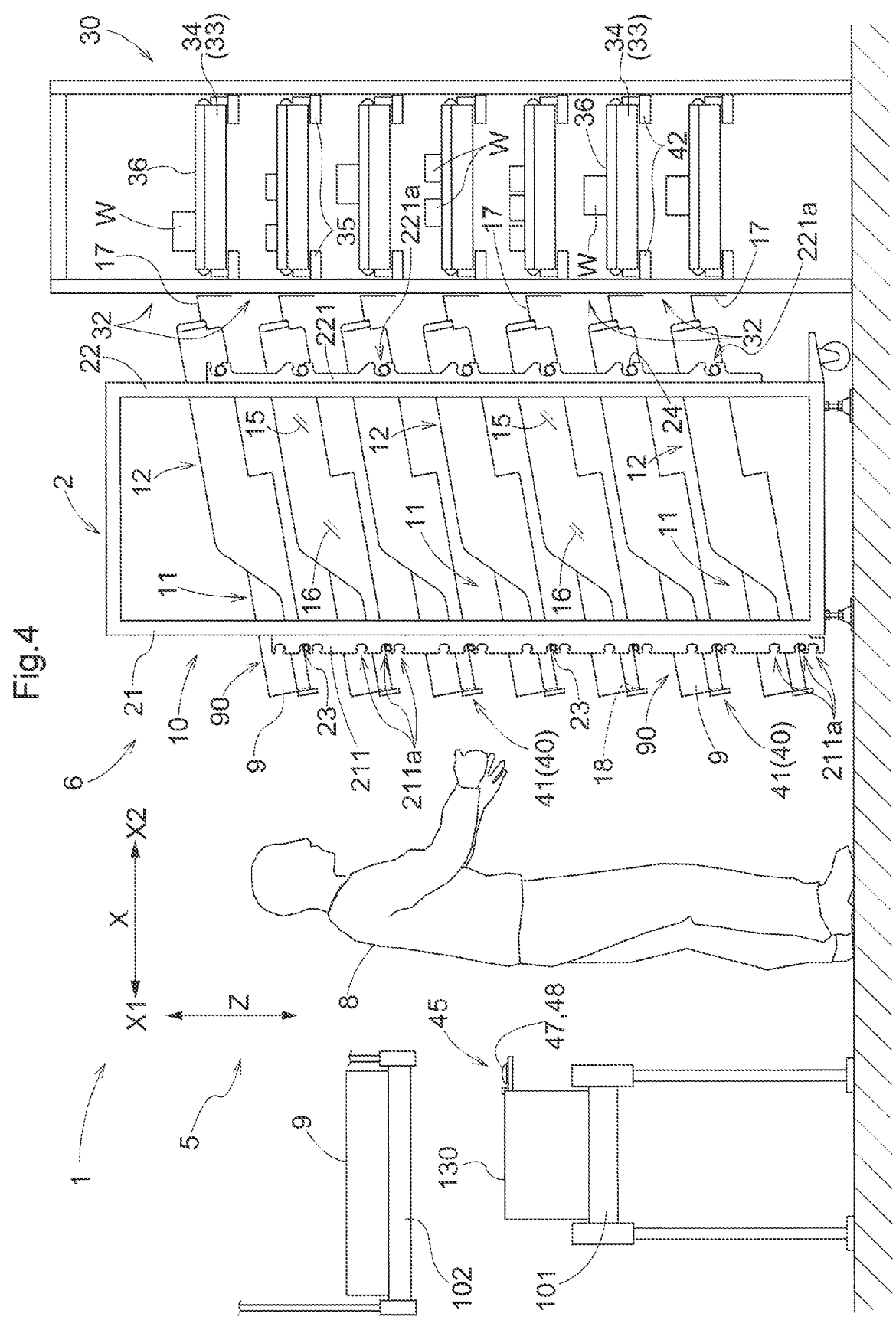

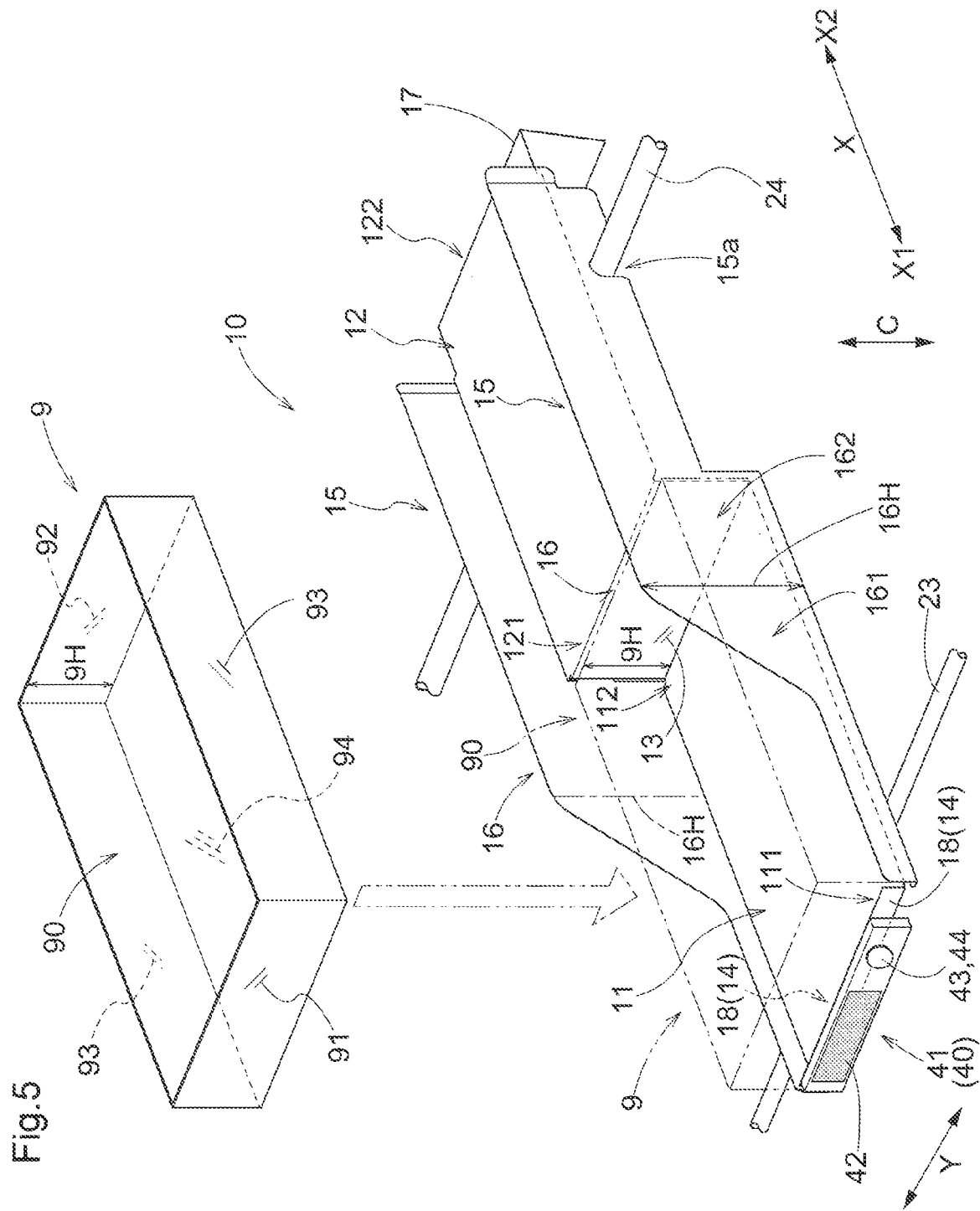

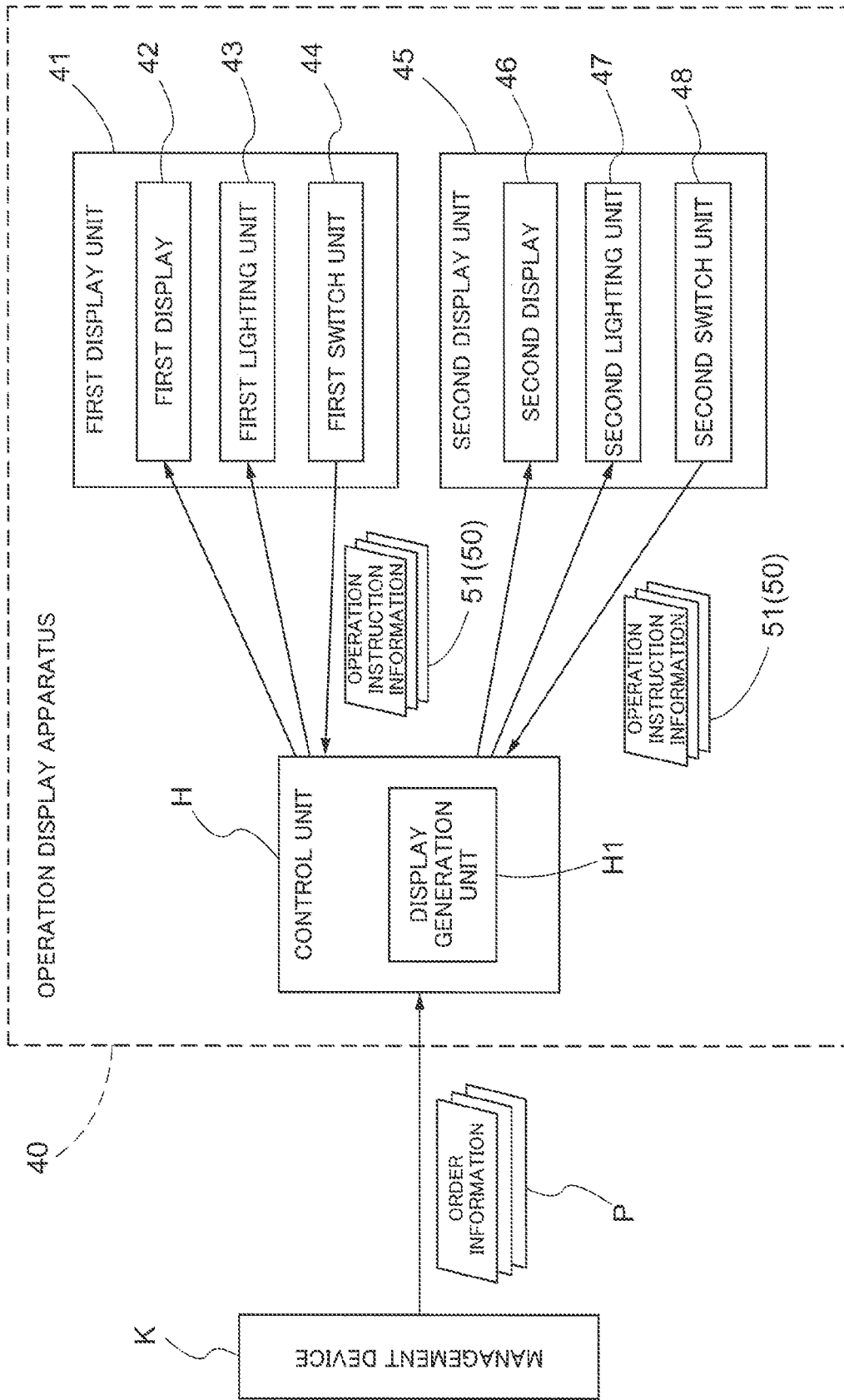

ARTICLE SORTING SYSTEM

CROSS-REFERENCE TO RELATED APPLICATIONS

This application claims priority to Japanese Patent Application No. 2020-181544 filed Oct. 29, 2020, the disclosure of which is hereby incorporated by reference in its entirety.

BACKGROUND OF THE INVENTION

1. Field of the Invention

The present invention relates to an article sorting system that includes an automatic sorting apparatus that automatically sorts a plurality of articles in accordance with an order.

2. Description of the Related Art

This type of conventional article sorting system is disclosed in JP 5562646B (Patent Document 1). Hereinafter, the reference numerals in parentheses in the description of the background section are those of Patent Document 1.

The article sorting system of Patent Document 1 is configured to include a sorting station (100) in which a plurality of delivery vehicles (200) automatically transport articles to containers (190), which are sorting destinations, to sort the articles based on article order information that is read at an input station (50). A plurality of containers (190) are provided in a plurality of rows and a plurality of levels in the sorting station (100). Tracks for the delivery vehicles (200) to move are also provided in the sorting station (100). An article that has passed through the input station (50) is transported by the conveyer and reaches a loading station (310) provided in the sorting station (100). A delivery vehicle (200) that has received an article at the loading station (310) moves along a vertical track to an upper side of the sorting station (100), thereafter horizontally moves along a horizontal track, and reaches the same row as the sorting destination container. Thereafter, the delivery vehicle (200) descends along a vertical track within the sorting station (100), and discharges the article to the sorting destination container (190). The delivery vehicle (200) that has discharged the article returns to the loading station (310) and receives another article.

In this article sorting system, a central controller (350) selects an appropriate transport route for each delivery vehicle (200), and performs a control such that delivery vehicles (200) do not collide with each other. Even when the travel direction of a delivery vehicle (200) is changed along the track, the orientation of the vehicle body of the delivery vehicle (200) is always kept fixed. Accordingly, a large amount of articles can be efficiently sorted in this article sorting system.

SUMMARY OF THE INVENTION

In such an article sorting system, there are restrictions on the size, shape, or the like, of articles that can be transported by the delivery vehicles (200). For this reason, there are cases where a sorting operation using an automatic sorting apparatus, such as the sorting station (100), cannot be performed for all of the articles to be sorted. In such cases, it is necessary to perform a sorting operation by operators or the like in a separate process, and perform a load-assembling operation to assemble the articles sorted in the separate process and the article sorted using the automatic sorting apparatus into the same container.

However, if the sorting operation in the separate process and the load-assembling operation are thus performed, more time is required to complete the final sorting, and more man-hours and more work places are required for these operations. As a result, there is a problem in that it is difficult to increase the efficiency of the entire sorting operation compared with the case of only performing the automatic sorting operation using the automatic sorting apparatus.

There is a desire for realization of an article sorting system with which the efficiency of the entire sorting operation can be easily increased in the case where the automatic sorting operation using the automatic sorting apparatus and the sorting operation by the operators are both performed.

An article sorting system according to the present disclosure includes: a sorting container support apparatus including a plurality of sorting container support units; a plurality of sorting containers supported by the sorting container support units; an automatic sorting apparatus that is arranged adjacent to the sorting container support apparatus and configured to automatically sort a plurality of articles supplied from a supply unit into the plurality of sorting containers supported by the sorting container support units, in accordance with an order; a work area that is set up adjacent to the sorting container support apparatus on a side opposite to the automatic sorting apparatus, and in which an operator performs a sorting operation to sort the articles into the plurality of sorting containers supported by the sorting container support units; and an operation display apparatus configured to display information for the operator in the work area, wherein the operation display apparatus displays, toward the work area side, operation instruction-related information, which is information regarding an instruction of the sorting operation for each of the plurality of sorting containers, on each of the plurality of sorting container support units or each of the plurality of sorting containers.

According to this configuration, even when there are both articles that can be sorted by the automatic sorting apparatus and articles that cannot be sorted by the automatic sorting apparatus and therefore need to be sorted by the operator, a sorting operation for these articles can be appropriately performed. At the time of the sorting, since the work area is set up adjacent to the sorting container support apparatus on the side opposite to the automatic sorting apparatus, the sorting operation by the automatic sorting apparatus and the sorting operation by the operator can be simultaneously performed in parallel for the sorting containers located at the same place. In addition, a load-assembling operation does not need to be performed to assemble the articles sorted by the automatic sorting apparatus and those sorted by the operator into the same container, as in the case where the sorting operation by the automatic sorting apparatus and the sorting operation by the operator are performed in separate processes. Accordingly, it is possible to reduce the man-hours and the time required for the entire sorting operation and to reduce the work place for these operations, compared with the case where the sorting operation by the automatic sorting apparatus and the sorting operation by the operator are performed in separate processes.

Further, since operation instruction-related information that is related to a sorting operation instruction is displayed on the sorting container support units or the sorting containers toward the work area side, the operator can efficiently perform the sorting operation while checking the operation instruction-related information.

Thus, according to this configuration, the efficiency of the entire sorting operation can be increased in the case where the sorting operation by the automatic sorting apparatus and the sorting operation by the operator are both performed.

BRIEF DESCRIPTION OF THE DRAWINGS

FIG. 3 is a perspective view that schematically shows a portion of an automatic sorting apparatus.
FIG. 4 is a side view of the article sorting system.
FIG. 5 is a perspective view showing a container support unit and to a structure in a surrounding area.
FIG. 6 is a control block diagram.

DETAILED DESCRIPTION OF PREFERRED EMBODIMENTS

Figure 1:
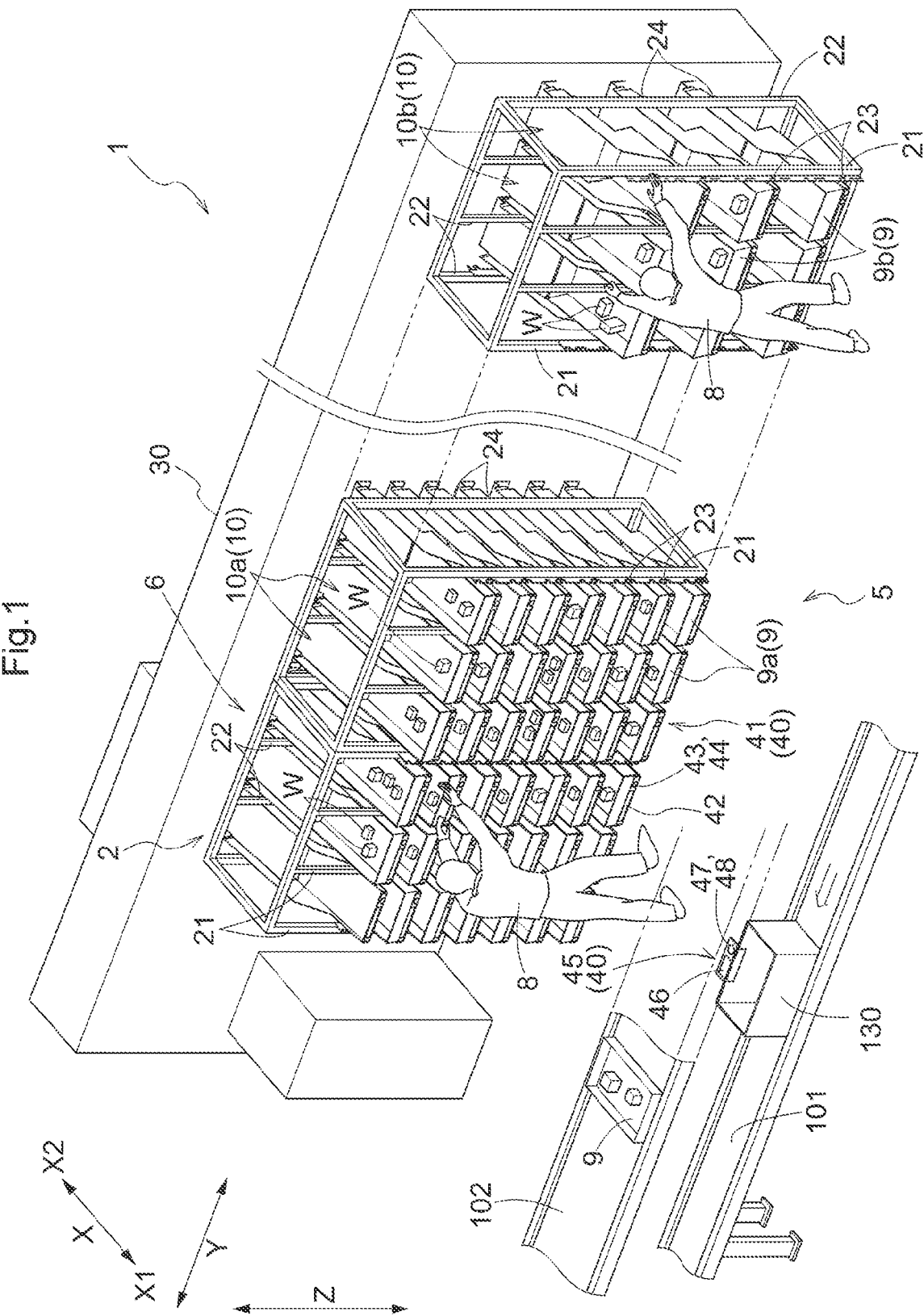
FIG. 1 is a perspective view of an article sorting system.
Figure 2:
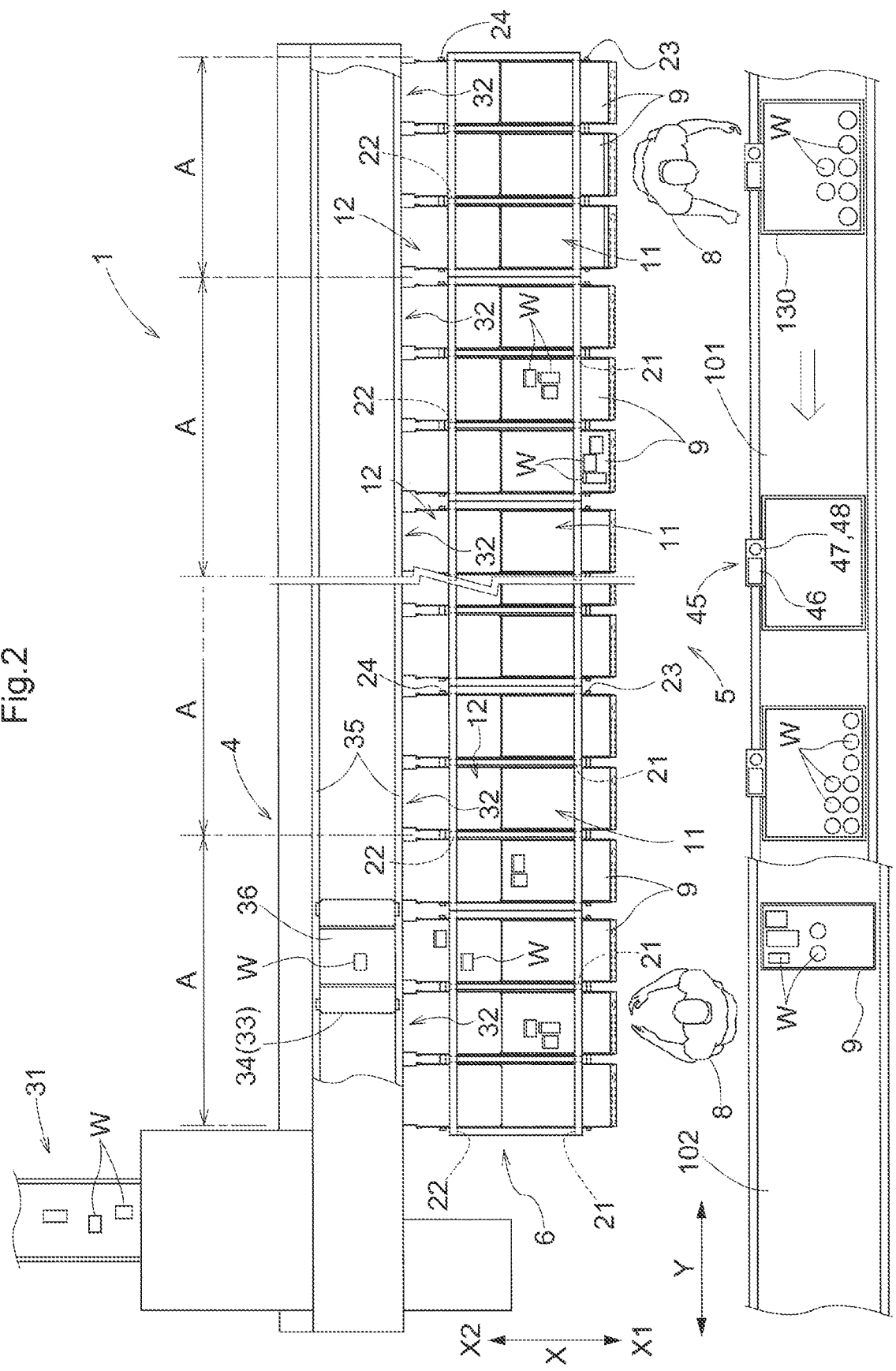
FIG. 2 is a plan view of the article sorting system.

Hereinafter, an article sorting system 1 will be described with reference to the drawings. As shown in FIGS. 1 and 2, the article sorting system 1 includes an automatic sorting apparatus 30, sorting containers 9, a sorting container support apparatus 6, a work area 5, and an operation display apparatus 40, which are primary constituent components.

In the following description, a direction in which articles W are discharged from discharge openings 32 of the automatic sorting apparatus 30 is referred to as a discharge direction X, the side away from the discharge openings 32 in the discharge direction X is referred to as a discharge-direction first side X1, and the side closer to the discharge openings 32 in the discharge direction X is referred to as a discharge-direction second side X2. A direction orthogonal to the discharge direction X when viewed in a vertical direction Z is referred to as a widthwise direction Y 1. Automatic Sorting Apparatus As shown in FIGS. 1, 2, and 4, the automatic sorting apparatus 30 is an apparatus for automatically sorting a plurality of articles W supplied from a supply unit 31 into a plurality of sorting containers 9, which are supported by sorting container support units 10, in accordance with an order. The supply unit 31 sequentially loads the supplied articles W into the automatic sorting device 30. The automatic sorting device 30 performs a sorting operation to sequentially sort the loaded articles W into the plurality of sorting containers 9 in accordance with an order. In the example shown in FIG. 2, the supply unit 31 is configured as a conveyor.

As shown in FIGS. 1 and 2, the automatic sorting device 30 is arranged adjacent to the sorting container support apparatus 6. The automatic sorting apparatus 30 is arranged adjacent to the sorting container support apparatus 6 in the discharge direction X. In the example shown in the diagrams, the automatic sorting apparatus 30 is arranged adjacent to the sorting container support apparatus 6 on the discharge-direction first side X1.

Although the details are omitted in the drawings, for example, the automatic sorting apparatus 30 includes an article discriminating unit for discriminating between articles W. The automatic sorting apparatus 30 sorts articles W based on the discriminating results obtained by the article discriminating unit. For example, the article discriminating unit includes a camera for capturing an image of each article W, and is configured to discriminate between articles W by performing image recognition processing on image data obtained by this camera. However, not limited to this configuration, an alternative configuration may be employed in which an IC tag, a barcode, or the like (storage unit) for storing article information is attached to each article W, and the article discriminating unit includes a reader (reading unit) for reading the article information and discriminates between the articles W based on the article information read by the reader, for example.

In the present embodiment, a plurality of discharge openings 32, from which sorted articles W are discharged, are provided as shown in FIGS. 2 and 3. In the example shown in the diagrams, the plurality of discharge openings 32 are constituted by a plurality of levels and a plurality of rows, and are arranged in an orthogonal lattice pattern. The automatic sorting apparatus 30 sorts articles W by discharging each article W from a specific discharge opening 32, which is determined based on an order, and delivering the article W to the sorting container support apparatus 6. Note that the order here is, for example, information indicating an order (picking order) that designates the type and the quantity of articles W to be shipped (which may be of a single type or may be a combination of a plurality of types). The automatic sorting apparatus 30 sorts articles W by discharging one or more articles W designated by orders to discharge opening 32 that are different for the respective orders.

In the present embodiment, the automatic sorting apparatus 30 includes transport devices 33, each of which transports an article W supplied by the supply unit 31 to one of the discharge openings 32 in accordance with an order, as shown in FIGS. 2 and 3. Each transport device 33 receives an article W transported from the supply unit 31 (conveyor). The transport device 33 then transports the article W toward one of the discharge openings 32 in accordance with the order. In this example, the transport devices 33 are a plurality of transport carriages 34. Each of the plurality of transport carriages 34 receives an article W transported from the supply unit 31 in the automatic sorting apparatus 30. Each of the transport carriages 34 that has received an article W sequentially travels along rails 35 provided in the automatic sorting apparatus 30, and transports the article W to one of the discharge openings 32 in accordance with the order. Specifically, the rails 35 have horizontal portions that are provided in the horizontal direction, more specifically, the widthwise direction Y, which is a direction orthogonal to the discharge direction X when viewed in the vertical direction Z, for each of the plurality of levels at which the discharge openings 32 are provided. Each transport carriage 34 is configured to travel along horizontal portions of the rails 35, thereby transporting an article W in the widthwise direction Y. The rails 35 may also include vertical portions that extend in the vertical direction Z and connect the horizontal portions arranged at respective levels. In this case, each transport carriage 34 is configured to travel up and down along the vertical portions of the rails 35, and can move to any horizontal portions arranged at respective levels. In this case, the number of transport carriages 34 is not limited by the number of levels at which the discharge openings 32 are provided. For this reason, for example, it is also possible to arrange a smaller or larger number of transport carriages 34 than the number of levels at which the discharge openings 32 are provided. Note that, in the example shown in FIG. 3, seven transport carriages 34 are arranged for the discharge openings 32 provided at seven levels. However, not limited to the above-described configuration, for example, the rails 35 may include horizontal portions that are arranged along the horizontal direction and are arranged at both the uppermost and lowermost levels, and vertical portions that are arranged along the vertical direction Z, connect the horizontal portions at the uppermost and lowermost levels to each other, and are arranged for respective rows. In this case, for a discharge opening 32 to which an article W is to be discharged, each transport carriage 34 that travels along the rails 35 travels in either of the horizontal portions of the rails 35 to the row in which this discharge opening 32 is arranged, and then travels a vertical portion of the rails 35 to the level at which the discharge opening 32 is arranged. Thus, the transport carriage 34 arrives at the target discharge opening 32 and discharges the article W from the discharge opening 32. After finishing discharging the article W, the transport carriage 34 again travels a vertical portion of the rails 35 and travels either of the horizontal portions connected to this vertical portion to withdraw from the discharge opening 32.

In the present embodiment, each transport carriage 34 includes a discharge conveyor 36 for supporting an article W from below and discharging the article W from a discharge opening 32. The discharge conveyor 36 moves the article W in the discharge direction X from the travel path of the transport carriage 34. The article W discharged in the discharge direction X by the discharge conveyor 36 is received by the sorting container support apparatus 6.

2. Sorting Container

The sorting containers 9 are containers for receiving articles W. As shown in FIGS. 1 and 2, the sorting containers 9 are supported by the sorting container support units 10. Each sorting container 9 receives an article W discharged from the automatic sorting apparatus 30 while being supported by the sorting container support units 10. In this example, the plurality of sorting containers 9 are supported by respective sorting container support units 10.

In the present embodiment, each sorting container 9 is a general-purpose container, as shown in FIG. 5. In this example, each sorting container 9 is formed in a rectangular parallelepiped shaped with an open upper surface due to having an opening portion 90. In a state of being supported by a corresponding sorting container support unit 10, each sorting container 9 has a container front surface 91 that faces toward the discharge-direction first side X1, a container back surface 92 that faces toward the discharge-direction second side X2, a pair of container side surfaces 93 that face in the widthwise direction Y, and a container bottom surface 94.

In the present embodiment, the sorting containers 9 include first-type sorting containers 9a, which are sorting containers 9 of a first size, and second-type sorting containers 9b, which are sorting containers 9 of a second size larger than the first size, as shown in FIG. 1. As will be described in detail later, in this example, either the first-type sorting container 9a or the second-type sorting container 9b is automatically selected by the automatic sorting apparatus 30 depending on the amount of articles W included in one order. One or more articles W are stored into the selected sorting container 9. In this example, the size refers to the volume of each sorting container 9. In this case, each second-type sorting container 9b has a larger volume than each first-type sorting container 9a. In the present embodiment, each first-type sorting container 9a and each second-type sorting container 9b have the same lengths in the discharge direction X and the widthwise direction Y of the bottom surface 94. That is to say, the first-type sorting container 9a and the second-type sorting container 9b have the same bottom area. Meanwhile, the container height 9H (FIG. 5) of the second-type sorting container 9b is set to be larger than the container height 9H of the first-type sorting container 9a.

3. Sorting Container Support Apparatus

As shown in FIGS. 1 and 2, the sorting container support apparatus 6 includes a plurality of sorting container support units 10. The sorting container support apparatus 6 further includes a support frame 2. The sorting container support apparatus 6 is an apparatus for receiving articles W from the automatic sorting apparatus 30 and put these articles W into the sorting containers 9. Each of the plurality of sorting container support units 10 supports a sorting container 9. The support frame 2 supports the plurality of sorting container support units 10.

The sorting container support units 10 are provided in correspondence with respective discharge openings 32, and support the sorting containers 9 such that articles W discharged from the discharge openings 32 are stored into the sorting containers 9. In the present embodiment, a plurality of sorting container support units 10 are arranged in lines in the vertical direction Z in correspondence with a plurality of discharge openings 32 arranged in the vertical direction Z, as shown in FIGS. 2 and 4. Further, the sorting container support units 10 are arranged in lines in the widthwise direction Y in correspondence with a plurality of discharge openings 32 arranged in lines in the widthwise direction Y. That is to say, the sorting container support units 10 are arranged in correspondence with a plurality of discharge openings 32 arranged in an orthogonal lattice pattern consisting of a plurality of levels and a plurality of rows.

In the present embodiment, the support frame 2 includes a plurality of first columns 21 and a plurality of second columns 22 that are arranged along the vertical direction Z, and first lateral bridges 23 and second lateral bridges 24 that are arranged along the horizontal direction, as shown in FIGS. 1 and 4. The first lateral bridges 23 and the second lateral bridges 24 support the plurality of sorting container support units 10 arranged in the widthwise direction Y, from below.

The plurality of first columns 21 are arranged at the same position in the discharge direction X with spaces therebetween in the widthwise direction Y. The plurality of second columns 22 are arranged further on the discharge-direction second side X2 than the plurality of first columns 21, and are arranged at the same position in the discharge direction X with spaces therebetween in the widthwise direction Y. In this example, the second columns 22 are arranged at the same position in the widthwise direction Y as the plurality of first columns 21 arranged in the widthwise direction Y.

In the present embodiment, the first lateral bridges 23 are supported by the plurality of first columns 21, as shown in FIG. 4. Each of the plurality of first columns 21 is provided with a first support bracket 211 for supporting the first lateral bridges 23. The first support bracket 211 has first cutout portions 211a, which are cut out to be recessed from an end portion on the discharge-direction first side X1 toward the discharge-direction second side X2. The support of the first lateral bridges 23 using the first cutout portions 211a is realized by hooking the first lateral bridges 23 onto the first cutout portions 211a.

In the present embodiment, the second lateral bridges 24 are arranged further on the discharge-direction second side X2 than the first lateral bridges 23, and are supported by the plurality of second columns 22, as shown in FIG. 4. Each of the plurality of second columns 22 is provided with a second support bracket 221 for supporting the second lateral bridges 24. The second support bracket 221 has second protruding portions 221a, which protrude from an end portion on the discharge-direction second side X2 toward the discharge-direction second side X2. The support of the second lateral bridges 24 using the second protruding portions 221a is realized by hooking the second lateral bridges 24 onto the second protruding portions 221a.

As shown in FIG. 5, each sorting container support unit 10 includes a slide surface 12, on which articles W discharged from a discharge opening 32 slide, a support surface 11 for supporting a sorting container 9 into which the articles W that have slid on the slide surface 12 are stored, and a connecting surface 13 that integrally connects the slide surface 12 and the support surface 11.

The aforementioned support frame 2 supports the sorting container support units 10 such that a slide-surface second end portion 122, which is an end portion of the slide surface 12 on the discharge-direction second side X2, is arranged adjacent to a lower end portion of a corresponding discharge opening 32. In the present embodiment, a guide portion 17 is provided on the discharge-direction second side X2 relative to the slide-surface second end portion 122 so as to be continuous therefrom, and the guide portion 17 is connected to the discharge opening 32 (FIG. 4). That is to say, in this example, articles W discharged from the discharge opening 32 move to the slide surface 12 through the guide portion 17.

In a state where the sorting container support unit 10 is supported by the support frame 2, the slide surface 12 is inclined downward as it extends from the slide-surface second end portion 122 toward a slide-surface first end portion 121. This configuration allows an article W discharged from the discharge opening 32 to slide on the slide surface 12 toward the discharge-direction first side X1.

The support surface 11 is a surface for supporting the container bottom surface 94 of the sorting container 9. The support surface 11 is arranged on the discharge-direction first side X1 relative to the slide surface 12, and is arranged below the slide-surface first end portion 121. Thus, the article W sliding on the slide surface 12 toward the discharge-direction first side X1 moves toward the support surface 11 side.

As shown in FIG. 5, the connecting surface 13 is a surface that connects the slide surface 12 and the support surface 11. Here, the connecting surface 13 connects the slide-surface first end portion 121 of the slide surface 12 and a support-surface second end portion 112 of the support surface 11.

In the state where the sorting container support unit 10 is supported by the support frame 2, the support surface 11 is inclined downward as it extends from the support-surface second end portion 112 toward a support-surface first end portion 111. With this configuration, the opening portion 90 formed in the upper surface of the sorting container 9 supported by the support surface 11 faces upward and toward the discharge-direction first side X1. For this reason, as shown in FIG. 4, it is easy for an operator 8 to check articles W in each sorting container 9 and take in and out the articles W in the work area 5, which is provided on the discharge-direction first side X1 relative to the sorting container support apparatus 6.

When a direction orthogonal to the support surface 11 is referred to as a support-surface orthogonal direction C, each sorting container support unit 10 is set up such that a step distance L, which is the distance between the slide surface 12 and the support surface 11 in the support-surface orthogonal direction C, is a distance larger than or equal the container height 9H. Thus, after an article W that has slid on the slide surface 12 passes through the slide-surface first end portion 121 of the slide surface 12, the article W is stored into the sorting container 9 from the opening portion 90 thereof without being interrupted by the container back surface 92. In the present embodiment, the step distance L is a distance that is larger than or equal to the container height 9H and is smaller than or equal to twice the container height 9H. This configuration makes it possible to reduce the drop when the article W that has slid on the slide surface 12 falls from the slide-surface first end portion 121 into the sorting container 9. Note that the length of the connecting surface 13 in the support-surface orthogonal direction C coincides with the step distance L.

In the present embodiment, each sorting container support unit 10 has slide side walls 15, which are side walls that protrude upward of the slide surface 12 on both sides in the widthwise direction Y of the slide surface 12 and are arranged along the discharge direction X, and support side walls 16, which are side walls that protrude upward of the support surface 11 on both sides in the widthwise direction Y of the support surface 11 and are arranged along the discharge direction X, as shown in FIG. 5. In the present embodiment, the slide side walls 15 are formed continuously with the support side walls 16 on the discharge-direction second side X2 relative to the support side walls 16. The support side walls 16 are formed continuously with the slide side walls 15 on the discharge-direction first side X1 relative to the slide side walls 15.

In the present embodiment, upper end portions of the slide side walls 15 are arranged above the slide surface 12, and lower end portions of the slide side walls 15 are arranged below the slide surface 12. In other words, the slide side walls 15 protrude both upward and downward of the slide surface 12. Since the slide side walls 15 protrude upward of the slide surface 12, an article W sliding on the slide surface 12 can be refrained from falling out of the slide surface 12 in the widthwise direction Y. Further, the article W sliding on the slide surface 12 can be appropriately guided so as to move along the discharge direction X by the slide side walls 15. In this example, a cutout portion 15a is formed in a portion of each slide side wall 15 that protrudes downward of the slide surface 12. The cutout portion 15a is formed as a cutout that is recessed upward from a lower end portion of each slide side wall 15. The cutout portion 15a is provided in each of the two slide side walls 15 arranged on the respective sides in the widthwise direction Y of the slide surface 12. The pair of cutout portions 15a are arranged at the same position in the discharge direction X. In this example, one second lateral bridge 24 in an orientation parallel to the widthwise direction Y is locked at the pair of cutout portions 15a. Thus, the sorting container support unit 10 is supported from below by the second lateral bridge 24 in an area where the slide surface 12 is present in the discharge direction X.

In the present embodiment, each support side wall 16 includes a second region 162, which is formed continuously from the corresponding slide side wall 15 in the discharge direction X, and a first region 161, which is a region on the discharge-direction first side X1 relative to the second region 162 and is formed continuously from the second region 162 in the discharge direction X.

When the length of each support side wall 16 in the support-surface orthogonal direction C is referred to as a support side wall height 16H, in the present embodiment, the support side wall height 16H in the second region 162 is larger than the container height 9H. With this configuration, an article W after passing through the slide-surface first end portion 121 of the slide surface 12 can be appropriately guided along the discharge direction X by the second regions 162 of the support side walls 16. Accordingly, the article W can be appropriately stored into the sorting container 9 without going outward in the widthwise direction Y.

In the present embodiment, each sorting container support unit 10 includes a positioning portion 14 for positioning the sorting container 9 at a prescribed position, as shown in FIG.

5. In the example shown in the diagrams, each sorting container support unit 10 includes a rising portion 18 that is raised upward from the support surface 11 on the discharge-direction first side X1 relative to the container bottom surface 94 of the sorting container 9. In a state where the sorting container 9 is supported by the support surface 11, the rising portion 18 is arranged opposing the container front surface 91 from the discharge-direction first side X1. A first display unit 41 of the operation display apparatus 40, which will be described later, is provided on a surface of the rising portion 18 that faces toward the discharge-direction first side X1. Further, each sorting container support unit 10 includes the pair of support side walls 16 and the connecting surface 13, as mentioned above. In the state where the sorting container 9 is supported by the support surface 11, the two support side walls 16 are separately arranged on the respective sides in the widthwise direction Y relative to the sorting container 9, and are arranged opposing the respective container side surfaces 93 in the widthwise direction Y. In the state where the sorting container 9 is supported by the support surface 11, the connecting surface 13 is arranged opposing the container back surface 92 from the discharge-direction second side X2. The sorting container 9 supported by the support surface 11 is positioned at the prescribed position by being surrounded by the rising portion 18, the pair of support side walls 16, and the connecting surface 13. Accordingly, in the present embodiment, the rising portion 18, the pair of support side walls 16, and the connecting surface 13 correspond to the "positioning portion 14".

In the present embodiment, the sorting container support apparatus 6 includes a plurality of first-type support units 10a for supporting the first-type sorting containers 9a, and a plurality of second-type support units 10b for supporting the second-type sorting containers 9b, as shown in FIG. 1. In this example, each first-type support unit 10a and each second-type sorting container 9b have different container heights 9H, as mentioned above. That is to say, each second-type sorting container 9b is set to be larger than each first-type sorting container 9a in terms of the container height 9H. As mentioned above, the step distance L between the slide surface 12 and the support surface 11 in each sorting container support unit 10 is set as a distance that is larger than or equal to the container height 9H. For this reason, in each second-type support unit 10b, the step distance L is set to be larger than the step distance L of each first-type support unit 10a. In line with this, in each second-type support unit 10b, the support side wall height 16H of the support side walls 16 is also set to be larger than the support side wall height 16H of each first-type support unit 10a. Due to this configuration, in the present embodiment, the first-type support units 10a are arranged at seven levels in the vertical direction Z, whereas the second-type support units 10b are arranged at three levels in the vertical direction Z, as shown in FIG. 1.

In the present embodiment, the automatic sorting apparatus 30 takes one of a plurality of orders as a target order, and performs a sorting operation so as to store articles W corresponding to the target order into a first-type sorting container 9a supported by a first-type support unit 10a if the amount of articles W included in the target order is smaller than a prescribed threshold, and to store the articles W corresponding to the target order into a second-type sorting container 9b supported by a second-type support unit 10b if the amount of articles W included in the target order is larger than or equal to the prescribed threshold. This configuration makes it possible to select a sorting container 9 of an appropriate size in accordance with the amount of articles W included in each order, and store one or more articles W included in the order into the thus-selected sorting container 9. In this example, the sorting operation is performed such that if the total volume of one or more articles W included in the target order is at a ratio smaller than a prescribed ratio that is preset for the volume of each first-type sorting container 9a, the articles W are stored into a first-type sorting container 9a. Further, the sorting operation is performed such that if the total volume of one or more articles W included in the target order is at the prescribed ratio that is preset for the volume of each first-type sorting container 9a or more, the articles W are stored into a second-type sorting container 9b. Naturally, articles to be sorted by the automatic sorting apparatus 30 are articles W other than articles W subjected to a later-described sorting operation by the operators 8. Here, the "prescribed ratio" may be, for example, a ratio that is set in the range from 60% to 90%. Although, in this example, the amount of articles W included in the target order is the total volume of one or more articles W included in the target order, the amount may alternatively be the weight, the quantity, or the like. Further, the prescribed threshold for the amount of articles W is set as appropriate in accordance with the shape of each article W to be sorted, the handling conditions of the sorting containers 9 in downstream processes, or the like.

4. Work Area

As shown in FIGS. 1, 2, and 4, the work area 5 is an area where the operators 8 perform the sorting operation, i.e., the operation of sorting articles W into the plurality of sorting containers 9 supported by the sorting container support units 10. The operators 8 are placed in the work area 5. In this example, basically, a plurality of operators 8 are arranged in the work area 5. The operation for the articles W is performed by the operators 8. The operation by the operators 8 includes performing a sorting operation, namely an operation of sorting articles W that cannot be automatically sorted by the automatic sorting apparatus 30, with respect to the sorting containers 9. In addition, in the present embodiment, the operation by the operators 8 further includes operations such as checking the articles W stored into the sorting containers 9 through the sorting operation, unloading the sorting containers 9 for which the sorting operation is complete, and replacing the sorting containers 9.

The work area 5 is set up adjacent to the sorting container support apparatus 6 on the side opposite to the automatic sorting apparatus 30. Here, the work area 5 is arranged adjacent to the sorting container support apparatus 6 on the discharge-direction first side X1. Further, the work area 5 is set up adjacent to the sorting containers 9 supported by the sorting container support units 10 and the rising portions 18 thereof. In the present embodiment, an article loading conveyor 101 and an unloading conveyor 102 are arranged on the discharge-direction first side X1 relative to the work area 5. For this reason, the work area 5 is set up in a region sandwiched by the sorting container support apparatus 6 and the article loading conveyor 101 and unloading conveyor 102 in the discharge direction X.

In the present embodiment, based on a predetermined standard for articles W, articles W that conform to the standard are supplied to the supply unit 31 of the automatic sorting apparatus 30, and articles W that do not conform to the standard are supplied to the work area 5. Here, the predetermined standard for articles W defines articles W that can be subjected to the automatic sorting operation by the automatic sorting apparatus 30. This standard is determined based on the shape, dimensions, structure, or the like, of articles W. For example, articles W that satisfy conditions that, for example, the articles W have a shape and dimensions that allow the articles W to be mounted on the transport carriages 34 of the automatic sorting apparatus 30 and transported without any problem, and the articles W have a shape, a material, and a structure with which the articles W are unlikely be damaged or deformed while being transported by the transport carriages 34, are defined as conforming to the standard. Articles W that do not conform to this standard are supplied to the work area 5. In other words, articles W that cannot be automatically sorted by the automatic sorting apparatus 30 or that are not suitable for automatic sorting are supplied to the work area 5.

In the present embodiment, the article loading conveyor 101 is arranged on the discharge-direction first side X1, which is the side opposite to the sorting container support apparatus 6 side (the discharge-direction second side X2) relative to the work area 5. In this example, the article loading conveyor 101 is provided such that it conveys articles W along the widthwise direction Y. Articles W that do not conform to the standard are supplied to the work area 5 by the article loading conveyor 101. In the example shown in the diagrams, loading boxes 130 in which the articles W that do not conform to the standard are stored are transported to the work area 5 by the article loading conveyor 101. Each operator 8 takes the articles W out of each loading box 130, and performs the sorting operation by putting the articles W into any of the plurality of sorting containers 9 in accordance with an order. By providing this work area 5, the automatic sorting by the automatic sorting apparatus 30 and the sorting operation by the operators 8 can be performed simultaneously in parallel for target sorting containers 9. Further, an operation of assembling the articles W sorted by the automatic sorting apparatus 30 and the articles W sorted by the operators 8 is not necessary, unlike the case where the sorting operation by the automatic sorting apparatus 30 and the sorting operation by the operators 8 are performed in separate processes.

After ending the sorting operation, each operator 8 removes the sorting container 9 from the sorting container support unit 10 and places the sorting container 9 on the unloading conveyor 102 (FIG. 1). Thus, the sorting container 9 is unloaded from the article sorting system 1 by the unloading conveyor 102. In the present embodiment, the unloading conveyor 102 is arranged on the discharge-direction first side X1, which is the side opposite to the sorting container support apparatus 6 side (the discharge-direction second side X2) relative to the work area 5. Further, in this example, the unloading conveyor 102 is provided such that it transports articles W along the widthwise direction Y. In the example shown in the diagrams, the unloading conveyor 102 and the article loading conveyor 101 are arranged so as to overlap with each other when viewed in the vertical direction Z (FIG. 2). Although the article loading conveyor 101 is used as a method for supplying articles W that do not conform to the standard to the work area 5 in this example, automatic transport vehicles, transport carriages operated by the operators 8, or the like may alternatively be used.

5. Operation Display Apparatus and Operation Instruction-Related Information

As shown in FIGS. 1 and 5, the operation display apparatus 40 is a device for displaying information for the operators 8 in the work area 5. The operation display apparatus 40 displays, toward the work area 5 side, operation instruction-related information 50, which is information regarding a sorting operation instruction for each of the plurality of sorting containers 9, on each of the plurality of sorting container support units 10 or the plurality of sorting containers 9. This configuration enables the operators 8 to efficiently perform the sorting operation while checking the operation instruction-related information 50 (FIG. 6). In this example, the operation display apparatus 40 is configured to display the operation instruction-related information 50 on each of the plurality of sorting container support units 10.

In the present embodiment, the first display unit 41 is provided on the rising portion 18 of each sorting container support unit 10, as shown in FIGS. 1 and 5. Specifically, in this example, the first display unit 41 includes a first display 42, a first lighting unit 43 that can be turned on and off, and a first switch unit 44 that can be pressed. The first switch unit 44 is a switch that is operated by an operator 8 when the operator 8 ends the sorting operation. When the operator 8 presses the first switch unit 44, the first lighting unit 43 turns off. The turning off of the first lighting unit 43 indicates an end of the sorting operation by the operator 8 for a target sorting container 9. In the present embodiment, the first display 42, the first lighting unit 43, and the first switch unit 44 are provided in a surface of the rising portion 18 that faces toward the discharge-direction first side X1. In the example shown in the diagrams, the first lighting unit 43 can be pressed, and also functions as the first switch unit 44.

In the present embodiment, the operation instruction-related information 50 includes information indicating the type and the quantity of articles W to be stored into each of the plurality of sorting containers 9. More specifically, information indicating the type and the quantity of articles W to be sorted by an operator 8 is displayed as the operation instruction-related information 50 on each first display 42, based on order information P. The operator 8 performs the sorting operation for each sorting container 9 while visually checking the type and the quantity of articles W to be put into the sorting container 9. Before placing, on the unloading conveyor 102, the sorting container 9 for which the sorting operation has been completed by the operator 8, the operator 8 checks whether or not the articles W corresponding to the target order have been correctly sorted into the sorting container 9. It is also preferable that information for thus checking the completion of the sorting operation is displayed as the operation instruction-related information 50 on the operation display apparatus 40. Information for checking the completion corresponds to information indicating a list of the type and the quantity of articles W that should be stored into the sorting container 9, for example.

In the present embodiment, the operation display apparatus 40 further includes second display units 45. The second display units 45 are attached to a plurality of loading boxes 130, which are supplied to the work area 5. Each second display unit 45 includes a second display 46, a second lighting unit 47 that can be turned on and off, and a second switch unit 48. These are integrally provided on each of the plurality of loading boxes 130. The operator 8 takes articles W out of each loading box 130 and sorts the articles into the sorting containers 9 based on the operation instruction-related information 50 displayed on the second display 46. After all articles W to be taken out have been taken out of the loading box 130, the second switch unit 48 is pressed. When the second switch unit 48 is pressed, the second lighting unit 47 turns off. The turning off of the second lighting unit 47 indicates an end of the operation of taking out the articles W performed by the operator 8 for the loading box 130 subjected to the operation. In the example shown in the diagrams, the second lighting unit 47 can be pressed, and also functions as the second switch unit 48.

To realize this configuration, in the present embodiment, the operation display apparatus 40 includes a control unit H for controlling the first display units 41 and the second display units 45, as shown in FIG. 6. The control unit H is configured to obtain order information P from a management device K for managing orders for sorting articles in the article sorting system 1. Here, the control unit H is communicably connected the management device K. The management device K creates and manages order information P associated with each of a plurality of sorting destinations so as to define the type and the quantity of articles W to be collected, based on orders from the sorting destinations or the like. For example, a plurality of pieces of order information P created are stored into an order database (not shown). The control unit H includes a display generation unit H1 for generating operation instruction information 51 to be displayed by the first display units 41 and the second display units 45, based on order information P transmitted from the management device K. The operation instruction information 51 is information indicating a specific operation instruction given to the operators 8 in order to have the operators 8 perform the above-described sorting operation. In this example, the operation instruction information 51 is dynamic information that varies from time to time and is displayed on the first display units 41 and the second display units 45 so as to indicate an operation to be performed by the operators 8 at each time. The operation instruction information 51 is an example of the operation instruction-related information 50.

The control unit H causes the first display units 41 and the second display units 45 to display the operation instruction information 51 generated by the display generation unit H1. Note that in the present embodiment, the content of the operation instruction information 51 to be displayed by the first display units 41 differs from the content of the operation instruction information 51 to be displayed by the second display units 45. That is to say, the display generation unit H1 generates the operation instruction information 51 to be displayed by the first display units 41 and the operation instruction information 51 to be displayed by the second display units 45. For example, the control unit H turns on the first lighting unit 43 subjected to the sorting operation, and controls the first display 42 to display the type and the quantity of articles W to be put into the sorting container 9. When the first switch unit 44 is pressed by the operator 8, the control unit H performs control to turn off the first lighting unit 43. The control unit H also turns on the second lighting unit 47 subjected to the sorting operation, and performs control to cause the second display 46 to display the type and the quantity of articles W to be taken out of the loading box 130. When the second switch unit 48 is pressed by the operator 8, the control unit H performs control to turn off the second lighting unit 47.

The operation display apparatus 40 displays the operation instruction-related information 50 such that the articles W corresponding to the target order are stored into a first-type sorting container 9a supported by a first-type support unit 10a if the amount of articles W included in the target order is smaller than a prescribed threshold, and the articles W corresponding to the target order are stored into a second-type sorting container 9b supported by a second-type support unit 10b if the amount of articles W included in the target order is larger than or equal to the prescribed threshold. Specifically, the operation display apparatus 40 displays the operation instruction-related information 50 such that the articles W are stored in a first-type sorting container 9a if the total volume of one or more articles W included in the target order is smaller than a prescribed ratio that is preset for the volume of each first-type sorting container 9a. Also, the operation display apparatus 40 displays the operation instruction-related information 50 such that the articles W are stored in a second-type sorting container 9b if the total of one or more articles W included in the target order is larger than or equal to the prescribed ratio that is preset for the volume of each first-type sorting container 9a. Here, articles W for which the operation instruction-related information 50 is displayed by the operation display apparatus 40 is those other than the articles W subjected to the sorting operation by the automatic sorting apparatus 30. As mentioned above, the "prescribed ratio" may be a ratio that is set in the range from 60% to 90%, for example. This configuration enables the operation instruction-related information 50 to be displayed by the operation display apparatus 40 such that articles W supplied to the work area 5 are stored into a sorting container 9 of an appropriate size. As mentioned above, in the present embodiment, the operation instruction-related information 50 is displayed by the control unit H causing the first display units 41 and the second display units 45 to display the operation instruction information 51. Each operator 8 can put articles W into a sorting container 9 of an appropriate size by simply performing the operation in accordance with the operation instruction information 51. Although, in this example, the amount of articles W included in the target order is the total volume of one or more articles W included in the target order, the amount may alternatively be the weight, the quantity, or the like. Further, the prescribed threshold for the amount of articles W is set as appropriate in accordance with the shape of each article W to be sorted, the handling conditions of the sorting containers 9 in downstream processes, or the like.

In the present embodiment, the operation display apparatus 40 is configured to be able to change whether or not to display the operation instruction-related information 50, does not display the operation instruction-related information 50 before the automatic sorting apparatus 30 starts putting articles W into the sorting containers 9, but displays the operation instruction-related information 50 after the automatic sorting apparatus 30 has started putting articles W into the sorting containers 9. Thus, the operators 8 start the sorting operation for articles W supplied to the work area 5 after the automatic sorting apparatus 30 has started the sorting operation. Accordingly, it is more likely that the articles W sorted by the automatic sorting apparatus 30 are arranged on a lower side of each sorting container 9, and the articles W sorted by the operator 8 are arranged on an upper side. In this example, the operation instruction-related information 50 starts being displayed on the first display 42 after the automatic sorting apparatus 30 has started putting the articles W into the sorting containers 9 and before the automatic sorting apparatus 30 finishes putting all the articles W into the respective sorting containers 9. This configuration makes it possible to keep the time required to complete all the sorting operations relatively short while arranging the articles W sorted by the automatic sorting apparatus 30 in a relatively lower portion of each sorting container 9.

In the present embodiment, the sorting container support apparatus 6 is divided into a plurality of sections A, and each of the plurality of sections A is set up so as to include a plurality of sorting container support units 10, as shown in FIG. 2. The operation display apparatus 40 displays the operation instruction-related information 50 toward different operators 8 in respective sections A. In this example, the sorting container support units 10 are divided by a fixed number of rows, and each divided rows are regarded as a section A. As a result, the work area 5 is also substantially divided into a plurality of sections A. Different operators 8 are placed for the respective sections A. In the example shown in the diagrams, one operator 8 is placed in each section A. The control unit H causes the operation instruction-related information 50 to be displayed in an order and a display mode that allow the operator 8 placed in each section A to efficiently perform the sorting operation. Each operator 8 performs the sorting operation based on the operation instruction-related information 50 for each of a plurality of sorting containers 9 included in the area of the corresponding section A. The operator 8 then moves the sorting container 9 for which the necessary sorting operation is complete in the area of the section A onto the unloading conveyor 102 and unloads the sorting container 9. By thus setting the sections A and displaying the operation instruction-related information 50 toward different operators 8 for respective sections A, the sorting operation can be efficiently performed simultaneously in parallel by the operators 8 in the plurality of sections A.

6. Other Embodiments

Next, other embodiments of the article sorting system 1 will be described.

(1) The above embodiment has described an example configuration in which the automatic sorting apparatus 30 is arranged adjacent to the sorting container support apparatus 6 on one side in the discharge direction X. However, the present invention is not limited to this configuration. If, for example, the automatic sorting apparatus 30 is configured to sort and discharge articles W toward both sides in the discharge direction X, the sorting container support apparatuses 6 may be arranged adjacent to the automatic sorting apparatus 30 on both sides in the discharge direction X. In this case, it is preferable that the work areas 5 are set up adjacent to the respective sorting container support apparatuses 6 on both sides in the discharge direction X of the automatic sorting apparatus 30. According to this configuration, the sorting container support apparatuses 6 and the work areas 5 are provided on both sides of the automatic sorting apparatus 30, further improving the efficiency of the entire sorting operation.

(2) The above embodiment has described an example configuration in which the first display unit 41 is provided on the rising portion 18 of each of the plurality of sorting container support units 10 to display the operation instruction-related information 50. However, not limited to this configuration, the first display unit 41 may alternatively be attached to any other portion of each sorting container support unit 10, or to the support frame 2, for example. Alternatively, instead of providing the first display unit 41, the operation instruction-related information 50 may be displayed on the container front surface 91 of each sorting container 9, for example. In this case, it is preferable that the operation display apparatus 40 includes a projector, and the control unit H controls the projector such that the operation instruction-related information 50 is projected onto the container front surface 91 of each sorting container 9. Note that the projector may be supported by the support frame 2, or may be supported by a floor surface or a ceiling of the facility.

(3) The above embodiment has described an example configuration in which the operation instruction-related information 50 is information indicating a specific operation instruction given to the operators 8, and is dynamic information that varies from time to time that is displayed on the first display 42 or the like. However, the specific mode of the operation instruction-related information 50 is not limited thereto. For example, the operation instruction-related information 50 may alternatively be static information such as identification information for calling information indicating a specific operation instruction given to the operators 8. It is preferable that such information is indicated by a one-dimensional code (barcode) or a two-dimensional code, or is stored in a readable IC tag or the like, for example. Information indicating the specific operation instruction is read from a server or the like and displayed on a mobile terminal or the like by each operator 8 reading the identification information using the mobile terminal or the like. The operator 8 performs the sorting operation in accordance with the operation instruction information 51 displayed on the mobile terminal or the like.

(4) The above embodiment has described an example configuration in which the automatic sorting apparatus 30 includes the transport carriages 34 and the plurality of discharge openings 32 arranged in an orthogonal lattice pattern consisting of a plurality of levels and a plurality of rows. However, not limited to this configuration, an alternative configuration may be employed in which, for example, the automatic sorting apparatus 30 includes a conveyor serving as a transport device 33, and a plurality of discharge openings 32 are provided along the transport direction of the conveyor.

(5) The above embodiment has described an example configuration in which the operation instruction-related information 50 is displayed after the automatic sorting apparatus 30 has started putting articles W into the sorting containers 9. However, not limited to this configuration, an alternative configuration may be employed in which, for example, the operation instruction-related information 50 is displayed after the automatic sorting apparatus 30 has completed the sorting operation. According to this configuration, the sorting operation by the operators 8 is started after the automatic sorting apparatus 30 has ended the sorting operation. Accordingly, it is possible to reduce the possibility that articles W put in by the automatic sorting apparatus 30 and articles W put in due to the sorting operation by the operators 8 enter a state of overlapping with each other in each sorting container 9, and to more reliably arrange the articles W sorted by the automatic sorting apparatus 30 in a lower portion of each sorting operation 9. Thus, the arrangement of the articles W in each sorting container 9 can be adjusted more easily, and the internal space in the sorting container 9 can be efficiently used.

(6) The above embodiment has described an example case where the operation instruction-related information 50 is information indicating the type and the quantity of articles W to be put in by operators 8. However, not limited to this configuration, an alternative configuration may be employed in which the operation instruction-related information 50 is only information indicating the quantity of articles W to be put in by the operators 8, for example.

(7) The above embodiment has described an example configuration in which different operators 8 are placed in respective sections A, and the operation instruction-related information 50 is displayed for each section A. However, not limited to this configuration, an alternative configuration may be employed in which, for example, the sorting container support apparatus 6 and the work area 5 are not divided into a plurality of sections A, but the entire space is regarded as one section A, and one or more operators 8 are placed in this section A.

(8) The above embodiment has described an example configuration in which the sorting container support apparatus 6 includes the plurality of first-type sorting containers 10*a* for supporting the first-type sorting containers 9*a* of the first size, and the plurality of second-type sorting containers 10*b* for supporting the second-type sorting containers 9*b* of the second size larger than the first size. However, not limited to this configuration, an alternative configuration may be employed in which sorting containers 9 of one type are used depending on the situation of the sorting operation, or sorting containers 9 of three or more types for different sizes and sorting container support units 10 of three or more types for supporting these sorting containers 9 are provided.

(9) The above embodiment has described an example configuration in which the rising portion 18, the pair of support side walls 16, and the connecting surface 13 of each sorting container support unit 10 function as the positioning portion 14. However, the present invention is not limited to this configuration. For example, an engaging portion provided in each sorting container 9 and an engaged portion provided in a corresponding sorting container support unit 10 may function as the positioning portion 14. In this case, for example, an alternative configuration may be employed in which a recessed portion serving as the engaging portion is provided in the container bottom surface 94 of each sorting container 9, a protruding portion serving as the engaged portion is provided in the support surface 11 of the corresponding sorting container support unit 10, and engagement between the recessed portion and the protruding portion allows the sorting container 9 to be positioned relative to the sorting container support unit 10. Conversely, the engaging portion may be a protruding portion, and the engaged portion may be a recessed portion.

(10) Note that the configuration disclosed in the above embodiment can also be applied in combination with configurations disclosed in other embodiments as long as no contradiction arises. Regarding other configurations as well, the embodiments disclosed in the present standard are merely examples in all respects. Accordingly, various modifications can be made as appropriate without departing from the gist of the present disclosure.

7. Summary of Above Embodiment

The summary of the above-described article sorting system will be described.

The article sorting system includes: a sorting container support apparatus including a plurality of sorting container support units; a plurality of sorting containers supported by the sorting container support units; an automatic sorting apparatus that is arranged adjacent to the sorting container support apparatus and configured to automatically sort a plurality of articles supplied from a supply unit into the plurality of sorting containers supported by the sorting container support units, in accordance with an order; a work area that is set up adjacent to the sorting container support apparatus on a side opposite to the automatic sorting apparatus, and in which an operator performs a sorting operation to sort the articles into the plurality of sorting containers supported by the sorting container support units; and an operation display apparatus configured to display information for the operator in the work area, wherein the operation display apparatus displays, toward the work area side, operation instruction-related information, which is information regarding an instruction of the sorting operation for each of the plurality of sorting containers, on each of the plurality of sorting container support units or each of the plurality of sorting containers.

According to this configuration, even when there are both articles that can be sorted by an automatic sorting apparatus and articles that cannot be sorted by the automatic sorting apparatus and therefore need to be sorted by the operator, the sorting operation for these articles can be appropriately performed. At the time of the sorting, since the work area is set up adjacent to the sorting container support apparatus on the side opposite to the automatic sorting apparatus, the sorting operation by the automatic sorting apparatus and the sorting operation by the operator can be simultaneously performed in parallel for the sorting containers located at the same place. In addition, a load-assembling operation does not need to be performed to assemble the articles sorted by the automatic sorting apparatus and those sorted by the operator into the same container, as in the case where the sorting operation by the automatic sorting apparatus and the sorting operation by the operator are performed in separate processes. Accordingly, it is possible to reduce the man-hours and the time required for the entire sorting operation and to reduce the work place for these operations, compared with the case where the sorting operation by the automatic sorting apparatus and the sorting operation by the operator are performed in separate processes.

Further, since operation instruction-related information that is related to a sorting operation instruction is displayed on the sorting container support units or the sorting containers toward the work area side, the operator can efficiently perform the sorting operation while checking the operation instruction-related information.

Thus, according to this configuration, the efficiency of the entire sorting operation can be increased in the case where the sorting operation by the automatic sorting apparatus and the sorting operation by the operator are both performed.

Here, it is preferable that the automatic sorting apparatus includes a plurality of discharge openings from which the articles sorted are discharged, and a transport device configured to transport the articles supplied by the supply unit to one of the discharge openings in accordance with the order, and the sorting container support units are provided in correspondence with the respective discharge openings, and support the sorting containers such that the articles discharged from the discharge openings are stored in the sorting containers.

According to this configuration, the automatic sorting apparatus includes the discharge openings corresponding to the respective sorting containers, and articles are sorted into any of the discharge openings by the transport device. In addition, the sorting operation by the operator can also be simultaneously performed in parallel for each of the plurality of sorting containers. Accordingly, the efficiency of the entire sorting operation can be improved.

It is preferable that, based on a predetermined standard for the articles, the articles that conforms to the standard are supplied to the supply unit of the automatic sorting apparatus, and the articles that do not conform to the standard are supplied to the work area.

According to this configuration, the automatic sorting apparatus can sort articles that can be sorted thereby, and the operator can sort articles that cannot be sorted by the automatic sorting apparatus. That is to say, the sorting operation can be performed using an appropriate method for each type of article.

It is preferable that the operation display apparatus is configured to be able to change whether or not to display the operation instruction-related information, does not display the operation instruction-related information before the automatic sorting apparatus starts putting the articles into the sorting containers, but displays the operation instruction-related information after the automatic sorting apparatus has started putting the articles into the sorting containers.

According to this configuration, the sorting operation by the operator starts after the automatic sorting apparatus has started putting articles into the sorting containers. Accordingly, it is more likely that the articles sorted by the automatic sorting apparatus are arranged on a lower side of each sorting container, and the articles sorted by the operator are arranged on an upper side. In general, articles that cannot be sorted by the automatic sorting apparatus are highly likely to have a special shape compared with articles that can be sorted by the automatic sorting apparatus. According to this configuration, the articles having such a special shape can be more easily arranged on a relatively upper side of each sorting container. Accordingly, the stability of the plurality of articles stored in each sorting container can be easily enhanced.

It is preferable that the operation instruction-related information includes information indicating a type and a quantity of the articles to be stored in each of the plurality of sorting containers.

According to this configuration, the operator can appropriately perform the sorting operation only by following the operation instruction-related information and putting articles of the designated type and quantity into the sorting container corresponding to the operation instruction-related information. Accordingly, the efficiency of the sorting operation by the operator can be easily improved.

It is preferable that the sorting container support apparatus is divided into a plurality of sections, the plurality of sections are each set up so as to include more than one of the sorting container support units, and the operation display apparatus displays the operation instruction-related information to the operator, the respective sections having different operators.

According to this configuration, the work area can be substantially divided into a plurality of sections. Accordingly, the sorting operation by operators can be simultaneously performed in parallel in the plurality of sections by placing different operators in the respective sections of the work area. Thus, the efficiency of the entire sorting operation can be further improved.

It is preferable that the sorting container support apparatus includes a plurality of first-type support units configured to support first-type sorting containers, which are the sorting containers having a first size, and a plurality of second-type support units configured to support second-type sorting containers, which are the sorting containers having a second size larger than the first size, and with one of a plurality of the orders being a target order, the automatic sorting apparatus performs a sorting operation and the operation display apparatus displays the operation instruction-related information such that the articles corresponding to the target order are stored into the first-type sorting containers supported by the first-type support units if the amount of the articles included in the target order is smaller than a prescribed threshold, and the articles corresponding to the target order are stored into the second-type sorting containers supported by the second-type support units if the amount of the articles included in the target order is larger than or equal to the prescribed threshold.

According to this configuration, the automatic sorting apparatus can select a sorting container of an appropriate size in accordance with the amount of articles included in each order, and put one or more articles included in the order into the selected sorting container. Accordingly, it is possible to reduce the possible of the sorting container being too large or too small for the amount of articles.

It is preferable that the sorting containers are general-purpose containers, and each of the sorting container support units includes a positioning portion configured to position a corresponding one of the sorting containers at a prescribed position.

According to this configuration, the sorting container supported by each sorting container support unit can be appropriately positioned.

INDUSTRIAL APPLICABILITY

The technique according to the present disclosure can be used in an article sorting system that includes an automatic sorting apparatus.

What is claimed is:
1. An article sorting system comprising:
a sorting container support apparatus comprising a plurality of sorting container support units;
a plurality of sorting containers supported by the sorting container support units;
an automatic sorting apparatus adjacent to the sorting container support apparatus and configured to automatically sort a plurality of articles supplied from a supply unit into the plurality of sorting containers supported by the sorting container support units, in accordance with an order;
a work area adjacent to the sorting container support apparatus on a side opposite to the automatic sorting apparatus, and in which an operator performs a sorting operation to sort the articles into the plurality of sorting containers supported by the sorting container support units; and
an operation display apparatus configured to display information for the operator in the work area,
wherein the operation display apparatus displays, toward the work area side, operation instruction-related information, which is information regarding an instruction of the sorting operation for each of the plurality of sorting containers, on each of the plurality of sorting container support units or each of the plurality of sorting containers.
2. The article sorting system according to claim 1,
wherein the automatic sorting apparatus comprises a plurality of discharge openings from which the articles to be sorted are discharged, and a transport device configured to transport the articles supplied by the supply unit to one of the discharge openings in accordance with the order, and
wherein the sorting container support units are provided in correspondence with the respective discharge openings, and support the sorting containers such that the articles discharged from the discharge openings are stored in the sorting containers.
3. The article sorting system according to claim 2,
wherein the automatic sorting apparatus, the sorting container support apparatus, and the work area are arranged in this order in a discharge direction in which the articles are discharged from the discharge openings.
4. The article sorting system according to claim 2,
wherein the transport device is a transport carriage configured to transport the articles, travel along a surface of the sorting container support apparatus which surface faces the discharge openings, and discharge the articles into the discharge openings,
the work area is opposite to the discharge openings across the sorting container support apparatus, and the plurality of sorting containers are supported by the sorting container support units in such a manner as to protrude from the sorting container support apparatus toward the work area.

5. The article sorting system according to claim 1, wherein based on a predetermined standard for the articles, the articles that conforms to the standard are supplied to the supply unit of the automatic sorting apparatus, and the articles that do not conform to the standard are supplied to the work area.

6. The article sorting system according to claim 5, further comprising:
an article loading conveyor disposed on a side of the work area which side is opposite to the sorting container support apparatus and configured to supply the articles that do not conform to the standard to the work area.

7. The article sorting system according to claim 1, wherein the operation display apparatus is configured to change whether or not to display the operation instruction-related information,
wherein the operation display apparatus does not display the operation instruction-related information before the automatic sorting apparatus starts putting the articles into the sorting containers, and
wherein the operation display apparatus displays the operation instruction-related information after the automatic sorting apparatus has started putting the articles into the sorting containers.

8. The article sorting system according to claim 1, wherein the operation instruction-related information includes information indicating a type and a quantity of the articles to be stored in each of the plurality of sorting containers.

9. The article sorting system according to claim 1, wherein the sorting container support apparatus is divided into a plurality of sections,
wherein the plurality of sections are each set up so as to include more than one of the sorting container support units, and
wherein the operation display apparatus displays the operation instruction-related information to the operator, the respective sections having different operators.

10. The article sorting system according to claim 1, wherein the sorting container support apparatus comprises a plurality of first-type support units configured to support first-type sorting containers, which are the sorting containers having a first size, and a plurality of second-type support units configured to support second-type sorting containers, which are the sorting containers having a second size larger than the first size, and
wherein, with one of a plurality of the orders being a target order, the automatic sorting apparatus performs a sorting operation and the operation display apparatus displays the operation instruction-related information such that the articles corresponding to the target order are stored into the first-type sorting containers supported by the first-type support units if the amount of the articles included in the target order is smaller than a prescribed threshold, and the articles corresponding to the target order are stored into the second-type sorting containers supported by the second-type support units if the amount of the articles included in the target order is larger than or equal to the prescribed threshold.

11. The article sorting system according to claim 1, wherein the sorting containers are general-purpose containers, and
wherein each of the sorting container support units comprises a positioning portion configured to position a corresponding one of the sorting containers at a prescribed position.

12. The article sorting system according to claim 1, further comprising:
an unloading conveyor disposed on a side of the work area which side is opposite to the sorting container support apparatus and configured to unload a sorting container among the plurality of sorting containers into which sorting container the automatic sorting apparatus has sorted an article and for which sorting container the operator has performed the sorting operation.

13. The article sorting system according to claim 12, further comprising:
an article loading conveyor configured to supply to the work area the articles for which the operator performs the sorting operation, and
the article loading conveyor and the unloading conveyor overlap with each other as viewed in a vertical direction.

* * * * *